United States Patent Office 3,445,233
Patented May 20, 1969

3,445,233
PHOTOSENSITIVE COMPOSITION

Lawrence Anthony Cescon, Wilmington, Del., assignor to E. I. du Pont de Nemours and Company, Wilmington, Del., a corporation of Delaware No Drawing. Filed Apr. 16, 1965, Ser. No. 448,839
Int. Cl. G03c *1/54*
U.S. Cl. 96—90 8 Claims

ABSTRACT OF THE DISCLOSURE

Light-sensitive compositions, comprising an essentially colorless oxidizable nitrogen-containing organic color-generator, a photooxidant and a light-sensitive aromatic diazonium compound, which form an intense color when irradiated with light of a wavelength $W_1$ but which, when irradiated with light of a different wavelength $W_2$, become insensitive to light of wavelength $W_1$.

The composition consists of (1) an organic color-generator, (2) a photooxidant, and (3) a light-sensitive diazonium compound which upon exposure to light of wavelength $W_2$ yields a reducing agent. When irradiated with a pattern of light of wavelength $W_1$, the organic color-generator and the photooxidant undergo a reaction to form an image corresponding to the pattern of light. Light of a second wavelength $W_2$ causes the diazonium compound to produce a reducing agent which prevents further color formation by reacting with the photooxidant. The composition is thus deactivated by light of wavelength $W_2$, and the image appears against a stable background. The light may be employed in the reverse order to form an image with the novel composition of this invention. A pattern of light of wavelength $W_2$ produces a latent image by deactivating the composition in the irradiated areas. The latent image is then developed by light of wavelength $W_1$. Thus, the invention composition provides either a positive or a negative copy depending upon the order in which the wavelengths of light $W_1$ and $W_2$ are applied. In each case the image-forming and deactivating processes may be essentially dry.

Image-forming compositions and processes play an essential part in photography, thermography, and related arts dealing with mechanisms of writing, printing, and producing images with the aid of light, heat, electricity, or combinations of these activating influences. Currently available methods of image production impose numerous limitations which are costly, inconvenient, time consuming and sometimes potentially hazardous. Classical photography, for example, although efficient in the utilization of light energy, employs expensive chemicals and papers, involves multi-step processing and drying and requires a highly skilled operator for consistently good results.

Thermography requires less operator skill and less expensive paper but produces images of poor quality which are easily destroyed. Mechanical printing, while inexpensive and rapid for repetitive printing, is decidedly more expensive and slow for sequential printing. In either the repetitive or sequential type of mechanical printing, a wet image is produced. Other photochemical image-forming systems involve the use of toxic chemicals such as ammonia, cyanide derivatives, or caustic materials. A new printing or imaging system which would overcome the limitations of the present methods would advance the art and be desirable.

Dry photochemical processes are known but they have certain disadvantages. For example, the dry photochemical process of U.S. Patent 3,079,258 suffers from the fact that the photosensitive composition remains sensitive to light. Photosensitive papers prepared according to the method of this patent cannot be handled in daylight. Similarly, the process of U.S. Patent 3,042,515 produces a dry photographic film. Depending upon the particular halocarbon used, the photographic film may be deactivated by heat but such treatment serves merely to volatilize a toxic halogenated compound such as carbon tetrabromide and thereby produces a health hazard.

An attempt to solve the problem of deactivation is described in U.S. Patent 3,082,086. This process depends upon the heat-promoted reaction between an organic amine which is serving as a color generator and an anhydride to render the amine inert. Anhydrides, however, are subject to hydrolysis with atmospheric moisture, and the resultant films do not have the desired storage stability. Also the time of heating to cause deactivation is unduly long. In some cases the amides which result from reaction between the amine and the anhydride are subject to further oxidation to colored material as disclosed in British Patent 917,919. In any event, this process does not work with tertiary amines. A deactivating method for printing or imagining systems which would improve upon present methods would advance the art and be desirable.

It is, therefore, an object of this invention to provide a new and novel composition suitable for the production of visible images by exposure to light of a given wavelength $W_1$, but yet capable of being permanently deactivated toward color formation by light of a different wavelength $W_2$. Another object is to provide a latent reducing agent for a photooxidant in a photo-sensitive composition. A further object is to provide a novel, rapid process for deactivating a light-sensitive composition. A still further object is to provide a process that will provide either a positive or a negative copy depending upon the order in which the two wavelengths of light are applied.

These objects are accomplished by the present invention as defined and described in the specification which follows.

This invention makes available a novel composition for forming an image and for preserving it by a dry, rapid, readily controlled procedure. Some of the advantages of this new composition and image-forming process of this invention over presently available image-forming systems are as follows.

Unlike photography, the process provided by the novel composition of the present invention is uniquely simple and at the same time rapid, and it may be conducted in a single apparatus or machine. In one embodiment, it requires no development step to produce a visible image. It may be dry and therefore does not require a wet processing treatment or complicated gadgetry to give the appearance of a dry system. It can produce directly either positive or negative copies.

Unlike xerography, it produces images in a variety of tones, ranging over the entire density scale, and requires no intricate image developing apparatus.

Unlike the thermography of commerce, the image can be deactivated so that it will not be destroyed by further exposure to the activating radiation. It also gives high-resolution images, in a variety of colors with excellent gradation of tone.

Unlike the diazo process, it is a dry process that does not require an objectionable material like ammonia, gives high resolution at greater speed, and produces either negatives or positives from negatives.

Unlike the products of U.S. Patents 2,927,025 and 3,079,258 which form images by a dry photochemical process, the products of the present invention can be deactivated toward further image formation or background color change.

Unlike the deactivation process of U.S. Patent 3,042,515, it does not volatilize a toxic halocarbon.

Unlike the deactivation process of U.S. Patent 3,082,086, the present deactivation process provides products with good storage stability and can be used to deactivate tertiary amines, an important class of color generators.

U.S.P. 2,884,326 relates to photosensitive compositions comprising a colorless phthalocyanine in an oxidized state and a light-sensitive diazonium compound. Upon exposure to light the diazonium compound yields a reducing agent which consists of a 1,2- or 1,4-aminohydroxybenzene or -dihydroxybenzene or naphthalene. The diazonium compounds of the present novel composition are the same as those of the patent and are affected by light in the same way. In the U.S.P. 2,994,326 compositions, however, the diazonium compounds provide a reducing agent that reacts with the colorless phthalocyanine to *produce* color. In the compositions of the present invention, the resultant reducing agent reacts with the photooxidant to deactivate the system and thereby *prevent* further color formation; the leuco dyes of the invention compositions are in a reduced state and require and oxidizing agent to form color. Hence the reducing agents from the diazonium compounds are incapable of producing color in these compositions.

More specifically, the present invention is directed to a photosensitive composition which contains in intimate association, essentially colorless, non-hydroscopic, inter-reactant progenitors of intensely colored organic color-bodies, said progenitors being activated toward generation of intensely colored organic color-bodies by radiation of a given wavelength $W_1$ and being permanently deactivated toward generation of intensely colored organic color-bodies by radiation of a second but different wavelength $W_2$, said photosensitive composition producing a permanent, positive image when first irradiated in a graphic pattern with radiation of wavelength $W_1$ followed by radiation of wavelength $W_2$ but producing a permanent negative image when first irradiated in a graphic pattern with radiation of wavelength $W_2$ followed by radiation of wavelength $W_1$, said composition comprising (a) an essentially colorless oxidizable, nitrogen-containing organic color-generator which, when contained in said photosensitive composition, is stable to oxidation by atmospheric oxygen under normal room and storage conditions but which is capable of oxidation to an intensely colored species, (b) a photooxidant which, when mixed with said oxidizable color-generator and irradiated with radiation of wavelength of about 2000 A. to about 4200 A. will, without further activation, oxidize said color-generator to said intensely colored species, and as an essential part of the composition, (c) a light-sensitive diazonium compound which upon exposure to light of wavelength $W_2$ in a region which the diazonium compound absorbs or to which it can be sensitized forms a reducing agent which prevents photooxidative color-formation by radiation of wavelength $W_1$.

A preferred embodiment is that composition heretofore defined wherein the organic color-generator is an aminotriarylmethane containing at least two p-dialkylamino-substituted phenyl groups having as a substituent ortho to the methane carbon atom an alkyl, alkoxy or halogen, the photooxidant is a 2,2′-bis(o-substituted phenyl)-4,4′,5,5′-tetraphenyl-biimidazole, and the diazonium compound is an aromatic diazonium salt having as a substituent in the 2- or 4-ring position a substituted amino, hydroxy, alkoxy or alkyl group.

The present invention also includes the process of producing an image having a light-stable background by irradiating in a stepwise manner the composition as heretofore defined with light of two different wavelengths of light being applied in a graphic pattern.

Additional embodiments include the heretofore described light-sensitive material in combination with a supporting base; a plastic film containing said light-sensitive composition and paper treated with said composition.

Organic color-generator

Many types of organic compounds function as organic color-generators in the invention composition. All are characterized as being essentially colorless, containing nitrogen, being stable to oxidation under normal storage conditions in the photosensitive composition and being capable of producing a color in a photooxidative process in the presence of a photooxidant. The process may be a simple oxidation of the colorless compound to a colored species. The oxidation may initially produce a reactive intermediate which then undergoes a further reaction with a second component of the color-generator to produce the final colored species. In some cases the reactive intermediate combines with the photooxidant to produce a colored species. Mixtures of color-generators may be used. These color generation processes, and the compounds which are adapted for them, are discussed in detail below.

Three different types of color generators are distinguished.

(A) Leuco form of dyes.—One type of color-generator which may form part of the light-sensitive composition is the reduced form of the dye having, in most cases, one or two hydrogen atoms, the removal of which together with one or two electrons produces a dye. Since the leuco form of the dye is essentially colorless, or in some instances it may be of a different color or of a less intense shade than the parent dye, it provides a means of producing an image when the leuco form is oxidized to the dye. This oxidation is accomplished by irridiating an intimate admixture of the organic color-generator and a photooxidant discussed below. A pattern of light of a wavelength of from about 2000 A. to about 4200 A. initiates in the irradiated area a redox reaction between the organic color-generator and the photooxidant. The result is the removal of one or two readily removable hydrogen atoms, depending on the structure of the leuco form of the particular dye chosen, with the production of a colored image against a background of unirradiated and, therefore, unchanged material. Representative dyes in the leuco form which are operative according to the present invention include:

(a) Aminotriarylmethanes, such as bis(4-benzylethylaminophenyl)(2-chlorophenyl)methane,
bis(4-dimethylaminophenyl)(4-dimethylamino-1-naphthyl)-methane,
bis(p-dimethylaminophonyl)(1,3,3-trimethyl-2-indolinylidenemethyl)methane, and
bis(4-dipropylaminophenyl)(o-fluorophenyl)methane.

Because of their superior resistance to color development due to air oxidation, the preferred species of aminotriarylmethanes have either an alkyl group, an alkoxy group or a halogen in the position ortho to the methane carbon in at least two of the aryl groups. Specific examples of this preferred species include:

bis(2-chloro-4-diethylaminophenyl)(p-chlorophenyl)methane
bis(2-chloro-4-diethylaminophenyl)phenylmethane
bis(4-diethylamino-2-methoxyphenyl)(4-nitrophenyl)methane
bis(4-diethylamino-o-tolyl)(4-benzylthiophenyl)methane
bis(4-diethylamino-o-tolyl)[p-(p-chlorobenzylthio)-phenyl]methane
bis(4-diethylamino-o-tolyl)(p-chlorophenyl)methane
bis(4-diethylamino-o-tolyl)(p-diethylaminophenyl)methane
bis(4-diethylamino-o-tolyl)(2,3-dimethoxyphenyl)methane
bis(4-diethylamino-o-tolyl)(2,4-dimethoxyphenyl)methane
bis(4-diethylamino-o-tolyl)(o-fluorophenyl)methane bis(4-diethylamino-o-tolyl)(4-isopentylthio-o-tolyl)-methane
bis(4-diethylamino-o-tolyl)(4-isopropylthio-o-tolyl)-methane
bis(4-diethylamino-o-tolyl)(p-methoxyphenyl)methane
bis(4-diethylamino-o-tolyl)(p-nitrophenyl)methane
bis(4-diethylamino-o-tolyl)phenylmethane
bis(4-diethylamino-o-tolyl)-2-thienylmethane
bis(4-dimethylamino-o-tolyl)(o-bromophenyl)methane
bis(4-dimethylamino-o-tolyl)(o-chlorophenyl)methane
(2-chloro-4-diethylaminophenyl)(4-diethylamino-o-tolyl)-phenylmethane
tris(4-dimethylamino-2-chlorophenyl)methane.

(b) Aminoxanthenes, such as 3-amono-6-dimethylamino-2-methyl-9-(o-chlorophenyl)-xanthene,
3,6-bis(diethylamino)-9-(o-chlorophenyl)xanthene,
3,6-bis(dimethylamino)-9-(o-methoxycarbonylphenyl)-xanthene.

(c) Aminothioxanthenes, such as 3,6-bis(dimethylamino)-9-(o-methoxycarbonylphenyl)-thioxanene,
3,6-dianilino-9-(o-ethoxycarbonylphenyl)thioxanthene.

(d) Amino-9,10-dihydroacridines, such as 3,6-bis(benzylamino)-9,10-dihydro-9-methylacridine,
3,6-diamino-9-hexyl-9,10-dihydroacridine.

(e) Aminophenoxazines, such as 5-benzylamino-9-diethylamino-benzo[a]phenoxazine
3,7-bis(diethylamino)phenoxazine.

(f) Aminophenothiazines, such as 3,7-bis(dimethylamino)-4-nitrophenothiazine,
3,7-bis[N-ethyl-N-(m-sulfobenzyl)amino]phenothiazine, monosodium salt,
3,7-diaminophenothiazine.

(g) Aminodihydrophenazines, such as 3,7-bis(benzylethylamino)-5,10-dihydro-5-phenyl-phenazine,
3,7-bis(dimethylamino)-5-(p-chlorophenyl)-5,10-dihydro-phenazine,
3,7-diamino-5,10-dihydro-5-methylphenazine,
3,7-diamino-5,10-dihydro-2,5,8-trimethylphenazine.

(h) Aminodiphenylmethanes, such as 1,4-bis[bis-(p-diethylyaminophenyl)methyl]piperazine,
bis(p-diethylaminophenyl)-1-benzotriazolylmethane,
bis(p-diethylaminophenyl)(2,4-dichloroanilino) methane,
bis(p-diethylaminophenyl)(octadecylamino)methane,
1,1-bis(p-dimethylaminophenyl)ethane.

(i) Aminohydrocinnamic acids (cyanoethanes), such as

α-cyano-4-dimethylaminohydrocinnamamide,
α,β-dicyano-4-(p-chloroanilino)hydrocinnamic acid, methyl ester,
p-(2,2-dicyanoethyl)-N,N-dimethylaniline,
p-(1,2,2-tricyanoethyl)-N,N,-dimethylaniline.

(j) Leucoindigoid dyes, such as 7,7′-diamino-5,5′-dichloroleucothioindigo,
6,6′-dichloro-4-methylleucothioindigo,
7,7′-dimethylleucoindigo,
5,5′-disulfoleucoindigo, disodium salt,
5,5′,7,7′-tetrachloroleucoindigo.

(k) 1,4-diamino-2,3-dihydroanthraquinones, such as 1,4-bis(ethylamino)-2,3-dihydroanthraquinone,
1-amino-4-methoxyanilino-2,3-dihydroanthraquinone,
1,4-diamino-2,3-dihydroanthraquinone,
1-p-(2-hydroxyethylamino)anilino-4-methylamino-2,3-dihydroanthraquinone.

It is not essential that the organic color-generator have a hydrogen which is removed by oxidation to form the colored species. One class of oxidizable compounds which do not contain removable hydrogens consists of acyl derivatives of leuco dyes which contain a basic NH group. Suitable compounds which have a basic NH group and which form amides when acylated include dihydrophenazines, phenothiazines, and phenooxazines. Specific examples of such compounds are 10-acetyl-3,7-bis(dimethyl-amino)phenothiazine, 10-(p-chlorobenzoyl)-3,7-bis-(diethylamino)phenothiazine, 5,10-dihydro-10(p-nitro-benzoyl)-5-phenyl-3,7-bis(phenylethylamino)-phenazine, and 10-(p-chlorobenzoyl-3,7-bis(naphthylmethylamino)-phenoxazine.

Also there are certain compounds related to triarylmethane leuco dyes which contain no hydrogen atoms that are removed during the oxidative color formation, but which, nevertheless, are photooxidized to a colored compound. Examples of such compounds are tris-(p-dimethylaminophenyl)-benzylthiomethane, 1-tris(p-diethylaminophenyl)methyl-2-phenylhydrazine, tris(4-diethylamino-o-tolyl)ethoxycarbonylmethane, bis(4-dipropylamino-o-tolyl) (o-fluorophenyl)butoxycarbonyl-methane and bis[tris(4-diethylamino-o-tolyl)methyl]-disulfide.

(B) Organic amines.—The organic amines that can be oxidized to a colored species but do not fall into the groups of the leuco dyes discussed above are disclosed in U.S. Patents, 3,042,515 and 3,042,517. Representative examples of this type of amine are 4,4′-ethylenedianiline, diphenylamine, N,N-dimethylaniline, 4,4′-methylenedianiline, triphenylamine, and N-vinylcarbazole.

(C) Aromatic diamines with coupling agent.—An aromatic diamine in combination with a coupling agent undergoes an oxidative condensation reaction which leads to azomethine and indoaniline dyes. More particularly, the reactants in the condensation are N,N-dialkylphenylenediamines and couplers such as active methylene compounds, aniline and phenolic compounds. The chemistry of these oxidative coupling reactions is reviewed by Vittum et al., in J. Phot. Sci., 2, 81 (1954) and ibid. 6, 157 (1958). It has been found that these oxidative condensation reactions are adaptable to photochemical processes and, furthermore, that such photosensitive compositions can be deactivated by the method of the present invention. Examples of N.N-dialkylphenylenediamines which are operative in the present process are N,N-dimethyl-p-phenylenediamine and N,N-dimethyltoluene-2,5-diamine. Suitable couplers include 2-acetyl-4′-chloroacetanilide, 2-benzoyl-2′-methoxyacetanilide, o-ethyl-phenol, 2-naphthol, 7-acetylamino-1-naphthol, N,N-dimethylaniline, and N,N-diethyl-m-toluidine.

Many color-generators perform best when an acid is present. Color-generators which contain amino groups can bind the acid by salt formation. The amount of acid is usually from 0.33 mole to 1 mole per mole of amino nitrogen. Representative acids are hydrochloric, hydrobromic, sulfuric, phosphoric, acetic, oxalic, and p-toluenesulfonic. Also useful are acids in the "Lewis" sense such as zinc chloride, zinc bromide, and stannic chloride.

Photooxidants

Many classes of compounds function as photooxidants in the light-sensitive compositions of the invention. Each of the compounds is characterized by having the ability to produce a permanent color when mixed with an organic color generator as discussed above and irradiated with a particular wavelength, $W_1$, of light from about 2000 A. to about 4200 A. The exact means by which photooxidants oxidize color-generators is perhaps not fully understood for all photooxidants. Two classifications of photooxidants are proposed below but the invention gives the stated results whether or not this is the true theory involved.

The mechanism by which a particular photooxidant functions depends not only upon the particular photooxidant but also upon the particular color-generator and the wavelength of the activating light, $W_1$. Based upon the mechanism by which they act as photooxidants, the photooxidants may be divided into two classes—initiators and acceptors. Some photooxidants, however, can function as either an initiator or an acceptor depending upon the wavelength of the activating light. Most photooxidants have a preferred mode of operation. Also some color-generators are more efficient with a particular type of photooxidant and care must sometimes be exercised in selecting these two components of the composition. In addition, the pH of the system is a factor, and a change in pH may change the mechanism by which the photooxidant functions. Acidic compositions are usually preferred.

An initiator type of photooxidant absorbs the activating light and dissociates into free radicals. These free radicals are the active oxidizing agent which reacts with the color-generator by an oxidation-reduction mechanism to produce the colored species.

An acceptor type of photooxidant generally absorbs none of the activating light. If it does absorb some of the activating radiation, the absorption is dissipated in a non-color-forming manner and does not lead to color generation. The activating radiation is, instead, absorbed by the color-generator to produce a photo-excited molecule which then undergoes an oxidation-reduction with the acceptor photooxidant. The term "acceptor" is applied because the photooxidant accepts an electron ejected by the color-generator. It is generally believed that the color-generator ejects the electron (Lewis and Bigeleisen, J. Am. Chem. Soc., 65, 2419 (1943) ). These ejected electrons then react very rapidly with an acceptor and the reaction is rendered irreversible.

A suitable criterion for judging whether a photooxidant is an acceptor or an initiator is the wavelength of light which causes color formation in the light-sensitive composition. This is easily determined by the use of appropriate filters. This wavelength usually will coincide with the absorption maximum of either the color-generator or the photooxidant. For example, nearly all leuco triarylmethane dyes that contain a dialkylamino group have a strong absorption band at about 2700 A. and a weaker band, frequently appearing in the spectrum as a shoulder, at about 3100 A. Light having a wavelength from about 2500 A. to about 3200 A. is, therefore, effective in causing the oxidation of these leuco dyes in the presence of an acceptor type photooxidant.

Examples of classes of photooxidants which function by the initiator mechanism are the biimidazoles and the tetraarylhydrazines. Specific examples are as follows:

(A) Biimidazoles 2,2′-bis(p-methoxyphenyl)-4,4′,5,5′-tetraphenyl biimidazole,
2,2′-bis(p-cyanophenyl)-4,4′,5,5′-tetrakis(p-methoxyphenyl)biimidazole,
2,8′-bis(p-cyanophenyl)-4,4,5,5′-tetrakis(p-methoxyphenyl)biimidazole,
2,2′-bis(3,4,5-trimethylphenyl)-4,4′,5,5′-tetrakis(p-methylthiophenyl)biimidazole,
2,2′-bis(o-methoxyphenyl)-4,4′,5,5′-tetraphenyl biimidazole,
2,2′-bis(2,4-dichlorophenyl)-4,4′,5,5′-tetrakis(p-methoxyphenyl)biimidazole,
2,2′-bis(o-bromophenyl)-4,4′,5,5′-tetraphenyl-biimidazole, and
2,2′-bis(2,4-dimethoxyphenyl)-4,4′,5,5′-tetraphenyl biimidazole.

The preferred hexaarylbiimidazoles of this invention are 2,2′,4,4′,5,5′-hexaphenylbiimidazoles having in the 2- and 2′-phenyl rings an ortho substituent that is chlorine, bromine, fluorine, $C_1$–$C_6$ alkoxy, or $C_1$–$C_6$ alkyl. A particularly preferred biimidazole is 2,2′-bis(o-chlorophenyl)-4,4′,5,5′-tetraphenylbiimidazole.

(B) Tetraarylhydrazines tetraphenylhydrazine,
tetra-p-tolylhydrazine, and
tetrakis(p-methoxyphenyl)hydrazine.

Examples of classes of photooxidants which function by the acceptor type of mechanism are given below along with specific examples of each class of photooxidant.

(C) Tetraacylhydrazines tetraacetylhydrazine,
tetraformylhydrazine, and
tetrabenzoylhydrazine.

(D) Diacylaminobenzotriazoles 1-diacetylaminobenzotriazole, and
1-dibenzoylamino-5-chlorobenzotriazole.

(E) Benzothiazole disulfides bis(2-benzothiazolyl) disulfide, and
bis(6-methoxy-2-benzothiazolyl) disulfide.

(F) Triacylhydroxylamines

N,N,O-triacetylhydroxylamine,
N,N,O-tripropionylhydroxylamine,
N,N,O-tribenzoylhydroxylamine, and
N,N,O-tris(p-chlorobenzoyl)hydroxylamine.

(G) Diacylaminotriazoles 1-diacetylamino-3,5-diphenyl-1H-1,2,4-triazole,
1-dipropionylamino-3,5-diphenyl-1H-1,2,4-triazole, and
1-dibenzoylamino-4,5-diphenyl-1H-1,2,3,-triazole.

(H) Alkylidene-2,5-cyclohexadien-1-ones 2,6-dimethyl-4-(1,1,3,3-tetrafluoro-1,3-dichloroisopropylidene)-2,5-cyclohexadien-1-one.

(I) Selected polymers polymethacrylaldehyde (J) Diacylaminopyrazoles 1-diacetylaminopyrazole, and
1-dipropionylamino-4-chloropyrazole.

The diacylaminopyrazoles are prepared by reacting pyrazole or pyrazole substituted in one or more of the 3, 4 or 5-positions with alkyl, halogen, aryl, nitro or cyano groups with hydroxylamino-O-sulfonic acid in aqueous sodium hydroxide solution to form a 1-aminopyrazole. The 1-aminopyrazole is then reacted with the necessary acid anhydride or acid halide to form the corresponding 1-diacylaminopyrazole.

(K) Bibenzotriazoles 1,2′-bibenzotriazole,
5,5′-dichloro-1,1′-bibenzotriazole, and
5,5′-dimethyl-1,1′-bibenzotriazole.

The 1,2′-bibenzotriazole and benzo ring substituted 1,2′-bibenzotriazoles except those having a nitro substituent are prepared by reacting a solution of the benzotriazole in aqueous sodium hydroxide with hydroxylamino-O-sulfonic acid to form a corresponding 2-aminobenzotriazole which is separated from its isomers by fractional crystallization. The 2-aminobenzotriazole is then mixed with o-chloronitrobenzene and heated to 160° to 205° C. for five hours in the presence of anhydrous sodium acetate to produce 2-(o-nitrophenylamino)benzotriazole. The product is isolated by filtration and recrystallized from ethanol. The 2-(o-nitrophenylamino)-benzotriazole is catalytically reduced with hydrogen to 2-(o-aminophenylamino)-benzotriazole which is diazotized in the usual way with nitrous acid to convert the primary amine to a diazonium salt which couples with the secondary amino group to form a cyclic triazole and yield a 1,2-bibenzotriazole.

Nitro derivatives of 1,2′-bibenzotriazoles cannot be prepared by the above procedure because the reduction of the nitro group prior to cyclization destroys any other nitro groups that are present. It is, therefore, necessary that the nitro derivatives of 1,2′-bibenzotriazole be prepared by treatment of the bibenzotriazole with nitric acid.

The 1,1′-bibenzotriazole and derivatives are prepared by tetraazotizing with nitrous acid o,o′-diaminoazobenzene or its derivatives to bisadiazonium salts. The resultant salts are then reduced to the 1,1′-bibenzotriazole with sulfur dioxide. Derivatives bearing such substituents as alkyl, halogen, sulfo, nitro, or alkanamido are prepared from the correspondingly substituted o,o-diaminoazobenzene.

A large class of photooxidants which may be utilized is the halogen compounds disclosed in U.S. Patent 3,042,-515. The most useful halogen compounds have a bond dissociation energy to produce a first free radical of not less than about 40 kilogram calories per mol. It is disclosed in U.S. Patent 3,056,673, that the spectral response to these halogenated photooxidants is, among other things, a function of the particular halogen compound which is chosen. Iodo compounds absorb at relatively long wavelengths, bromo compounds absorb at intermediate wavelengths and chloro compounds absorb at short wavelengths. With a source of ultraviolet light such as a sun lamp the iodo compounds will function as initiators while the chloro and bromo compounds function as acceptors. The operative mechanism may be changed by utilizing another light source having a different spectral distribution. Changing the color-generator and the spectral region in which it absorbs, also can change the mechanism by which these halogenated photooxidants function.

Specific examples of this class of photooxidant are:

(L) Halogen compounds carbon tetraiodide,
iodoform,
carbon tetrabromide,
1,2,3,4-tetrabromobutane,
hexachloroethane, and
1,2,3,4-tetrachlorobenzene.

Diazonium compounds

A composition which comprises a photooxidant and an organic color-generator, as described above, is photosensitive and produces an image when irradiated with a graphic pattern of light having a wavelength $W_1$. This image, however, is not permanent because the unirradiated areas of the image will become colored during usage if the ambient light contains any light whatsoever of wavelength $W_1$. A means to deactivate the photosensitive composition is, therefore, needed so that the composition is no longer photosensitive. If the composition remains photo sensitive it will be acted upon by ambient light to alter or destroy the image. A deactivating means has been found. It consists of including in the photosentitive composition a light sensitive diazonium compound which upon exposure to light of wavelength $W_2$ which is different from $W_1$ produces a reducing agent.

This deactivation process may be used in two different ways. In the first the photosensitive composition is irradiated with a graphic pattern of light of wavelength $W_1$ to produce an image. This image is then deactivated by irradiation with light of wavelength $W_2$. This irradiation with light of wavelength $W_2$ may be a brief exposure at a high intensity. Or, if the ambient light conditions following image formation provide some light of wavelength $W_2$, it may be advantageous to allow the deactivation to occur during normal usage of the material upon which the image has been formed. In this case no separate deactivation step or equipment is required.

In the second procedure the reverse order of light exposure is followed. Irradiation with a pattern of light of wavelength $W_2$ produces a latent image, i.e., those areas upon which $W_2$ impinges are deactivated toward color formation by light of wavelength $W_1$. The resultant latent image is then developed into a visible image by irradiation with light of wavelength $W_1$.

The images produced by these two different procedures can be formed so that they have a positive-negative relation. Suppose a substrate which bears printed or written characters is transparent to light of wavelength $W_1$ and reflects light of wavelength $W_2$. Irradiation with light of wavelength $W_1$ through the substrate bearing the characters will produce a negative copy on a film containing the photosensitive composition. The negative copy can now be deactivated by direct irradiation with light of wavelength $W_2$. If, however, light of wavelength $W_2$ is reflected from the substrate onto a film containing the photosensitive composition and the film is subsequently developed with light of wavelength $W_1$, a positive copy is obtained. Thus, the same printed or patterned material can be copied in either positive or negative form depending on the order in which the two different wavelengths of light, $W_1$ and $W_2$, are applied.

The useful diazonium compounds which may be used in the invention photosensitive compositions include diazotized p-(p-tolylthio)aniline
2,4,5-trimethoxyaniline
5-amino-2-diethylamino-p-anisic acid, methyl ester
4-(p-tolythio)o-ansidine
4-(4-amino-3-butylphenyl)morpholine
4-(4-amino-2,5-diethoxyphenyl)morpholine
4-(4-amino-2,5-dibutoxyphenyl)morpholine
4-(p-aminophenyl)morpholine
4-amino-1-naphthol
4-amino-7-methoxy-3-methyl-1-naphthol
4-amino-3-methyl-1-naphthol
$N^2$,$N^2$-dimethyl-1,2-naphthalenediamine
N,N-diethyl-1,4-naphthalenediamine
2-methyl-$N^1$-phenyl-1,4-naphthalenediamine
4-amino-2,6-dimethoxyphenol
$N^1$,$N^1$-diethyl-4-methyl-m-phenylenediamine
4-methoxy-$N^3$,$N^3$-dimethyl-m-phenylenediamine
N,N-diethyl-o-phenylenediamine
$N^1$,$N^1$-diethyl-4-methyl-o-phenylenediamine
N-methyl-N-phenyl-o-phenylenediamine
p-phenylenediamine
2-chloro-5-methoxy-$N^1$,$N^1$-dimethyl-p-phenylenediamine
$N^1$-cyclohexyl-2-methoxy-p-phenylenediamine
2,5-butoxy-N,N-diethyl-p-phenylenediamine
2,5-diethoxy-N,N-dimethyl-p-phenylenediamine
N,N-dietyhl-p-phenylenediamine
2,5-dimethoxy-N-phenyl-p-phenylenediamine
N,N-dimethyl-p-phenylenediamine
N-(2-hydroxyethyl)-N-ethyl-p-phenylenediamine
N-(p-methoxyphenyl)-p-phenylenediamine
N-phenyl-p-phenylenediamine
2-phenyl-$N^4$,$N^4$-dimethyl-p-phenylenediamine
1-(p-aminophenyl)piperidine
1-(p-aminophenyl)pyrrolidine
$N^2$,$N^2$-dimethyltoluene-2,5-diamine
4-amino-2,6-xylenol.

These compounds are used in the form of their salts such as chlorides, zinc chloride complexes, sulfates, tetrafluoroborates, trifluoroacetates. Also included are inner salts referred to as diazonium oxides such as, for example 3,5-dimethoxy-1,4-benzenediazonium oxide
3,5-dimethyl-1,4-benzenediazonium oxide
1,4-naphthalenediazonium oxide
6-methoxy-2-methyl-1,4-naphthalenediazonium oxide.

The compounds may have various innocuous substituents in the aryl nuclei such as lower alkyl, lower alkoxy, aryl, arylthio, bromine, chlorine, hydroxy. A diamine may have one or both of the hydrogens of one of the amino groups replaced by lower alkyl or aryl. In general, a suitable light sensitive deactivating diazonium compound yields on exposure to light a reducing agent that is a 1,2- or 1,4-aminohydroxy or dihydroxybenzene or naphthalene.

Activating light

The wavelength of light $W_1$ is usually between 2000 and about 4200 A. and $W_2$ between 2000 and 5500 A. In some cases the activating radiations may be extended to longer wavelengths by adding certain dyes to the photosensitive composition. Such dyes function as sensitizers as is well known in the art. See, for instnce, C. E. Kenneth Mees, The Theory of the Photographic Process, The Macmillan Company, 1952, pages 317–493. In general, the light of wavelength $W_2$ is absorbed by the diazonium compound. Light of wavelength $W_1$ is usually absorbed by the photooxidant if the photooxidant is an acceptor. Thus, the light absorption of the diazonium compound and of either the photooxidant or the color-generator usually determine the wavelengths $W_1$ and $W_2$. Light of wavelengths $W_1$ and $W_2$ need not be monochromatic. In fact, bands several hundred angstrom units in width are frequently desirable. Suitable bands of light are readily obtained by the use of filters. Cut-off filters, which transmit all light beyond a certain wavelength, are useful, particularly when the transmitted wavelengths of light are on the edge of the useful spectral region. Bandpass filters, which transmit only a particular band of light, are also useful. They may be either the interference type or the type based on the selective transmission of the filter material.

Since most compounds have rather broad light absorption bands and since these same absorption bands frequently determine the wavelengths $W_1$ and $W_2$, there is a possibility of overlap between $W_1$ and $W_2$. This overlap is usually undesirable because it can reduce both the photographic speed and the ultimate color density. In some cases, therefore, it is desirable that wavelengths $W_1$ and $W_2$ be separated by at least several hundred angstrom units. A small amount of overlap is frequently unavoidable. For example, the preferred photooxidants, the biimidazoles, have a very broad absorption band centered at about 2700 A. and extending to about 3100 A. Any wavelength, however, up to 4300 A. can be utilized to initiate the color-forming reaction without resorting to the addition of sensitizing compounds. The same 3100 A. to 4300 A. region can also be used for the deactivation reaction, and it thereby corresponds to $W_2$. For equimolar concentrations of diazonium compound and biimidazole, the diazonium compound should have a higher extinction coefficient at wavelength $W_2$ than does the biimidazole, if the deactivation reaction is to be achieved without undue coloration. Small amounts of overlap produce no undesirable results and in some cases can even result in more efficient deactivation.

In contrast, if the diazonium compound of the redox couple trails its effective light absorption, i.e. $W_2$, into the main absorption band of the biimidazole, i.e. $W_1$, the result will be reduction in both the photographic speed and the ultimate color density. Control of the absorbance can be achieved by paying careful attention to the concentrations of the various light absorbing species. If the quantum yields of the two primary reactions are known, corresponding adjustment in the concentrations of the light absorbing species should also be made.

It is frequently desirable to evaluate by actual test the various components of the photosensitive composition, and to determine the stoichiometry of the reactions involved and the wavelengths of light $W_1$ and $W_2$ which cause these reactions. A suitable test is as follows:

A composition consisting of photooxidants color-generator and diazonium compound is either applied to a suitable substrate, such as paper, or is mixed with a solution of a suitable polymer, i.e. matrix which is cast into a film or coated onto substrates such as paper and films. Two filters, each passing light of a different wavelength, are arranged so that each filter covers one-half of the film or impregnated paper. The film or impregnated paper is then irradiated through the filters with a light source which emits light including those wavelengths passed by the filters. The positions of the filters are reversed and the irradiation is repeated for exactly the same length of time. If both halves of the impregnated paper or film now have the same depth of shade, no deactivation has occurred. If the two halves are of different intensities, deactivation has occurred. In the half which is of greater intensity, the wavelength of light applied first will have caused color formation, i.e., it will have been colored by light of wavelength $W_1$. In that half which is of lesser intensity, the wavelength of light applied first will have caused deactivation, i.e., it will have been deactivated by light of wavelength $W_2$. Larger differences of color between the two halves, correspond to greater selectivity between the two wavelengths of light, $W_1$ and $W_2$. This procedure is described in detail in the representative examples.

The wavelength, $W_1$, of the radiation which activates color formation varies with both the photooxidant and the color-generator employed. Similarly, the wavelength, $W_2$, of the radiation which deactivates the photosensitive composition varies with the diazonium compound. In the absence of sensitizers, the wavelength $W_1$ will be within the range 2000 to 4200 A., and wavelength $W_2$ will be within the range 2000 to 5500 A. Suitable means for providing such radiation include sunlamps, electronic flash guns, germicidal lamps, and ultraviolet lamps providing specifically light of long wavelength (3663 A.), ultraviolet lamps providing light of short wavelength (2537 A.), incandescent lamps, and sunlight.

Ratio of reactants

The amount of color-generator determines the depth of color which will be obtained with a given photosensitive composition. The photooxidant is, therefore, measured in proportion to the color-generator. Many color generators, such as the leuco triarylmethane dyes, will require a molar equivalent of photooxidant for complete conversion to the colored form. Less than molar equivalents of photooxidants are operable but wasteful of color-generator. Thus, ratios of photooxidant to color-generator from about 1:10 to about 100:1 are operable. The preferred range is from 1:1 to 2:1.

The diazonium compound is employed to the extent of from 0.1 mole to 20 moles per mole of photooxidant in the composition. An amount of the diazonium compound within this range will usually provide a difference between the optical density of the image and of the background of at least 0.3 which is more than sufficient to discern a distinct image. The preferred molar ratio of diazonium compound to photooxidant is between 0.2:1 and 10:1. The amount of diazonium compound employed relative to the photooxidant depends upon the particular diazonium compound selected and upon the substrate which bears the deactivatable light-sensitive composition. For example, one diazonium compound may require a proportion of 10 moles of the diazonium compound per mole of photooxidant to deactivate the composition on paper while another diazonium compound will be effective at a ratio of 2:1. The diazonium compound that is preferably used at a ratio of 10:1 on paper will be effective in a plasticized polymer as a substrate at a ratio of 3:1.

Solvents

A solvent in the proper amount is critical for image formation followed by the proper functioning of the deactivating diazonium compound. Papers bearing the light-sensitive composition that contain too much solvent do not form color or produce images, owing to simultaneous deactivation. When allowed to dry completely, neither color formation nor deactivation occurs. The system will operate with varying degrees of effectiveness within the range of conditions represented by a large amount of solvent and no solvent at all.

It has been difficult to specify the solvent content of paper impregnated with the invention photodeactivatable light-senitive composition because the impregnating solution contains a mixture of solvents (polyethylene glycol, acetone, dimethylformamide, water and the like) and the paper generally contains absorbed moisture. The solvent retained on the substrate after "drying" is of unknown composition. The specific conditions under which image formation and deactivation occur have, therefore, not been defined apart from the extreme conditions of a great deal of solvent (paper irradiated shortly after the composition is applied) and very little or no solvent (vigorous drying under infra-red lamp).

Besides acting as a solvent component, water serves to produce phenolic compounds upon irradiation of the diazonium compounds in its presence. The phenolic compounds are reducing agents which desensitize the system against color change and provide deactivation by reaction with free radicals from the photooxidant before these radicals can react with the color generator to form color and an image.

Polyethylene glycol is an effective nonvolatile solvent. It may range in molecular weight from about 200 to 1000. At molecular weights above 1000 the material becomes a waxy solid at room temperature and is less suitable than the lower molecular weight liquid form of the material. The polyethylene glycol may also serve as a plasticizer for cellulose acetate in which case it may compose 30% to 70% by weight of the cellulose acetate-plasticizer composition.

It is conceived that a solvent-less composition could be prepared which would remain inactive and insensitive to radiation until a suitable solvent is applied. The solvent could be sprayed, swabbed, or brushed over the surface of the composition and the system irradiated for image formation and then for deactivation when sample swatches of the composition indicated proper solvent content for these effects.

Substrate

The photosensitive compositions of the present invention may be utilized as a coating, impregnant or additive for various substrates. Frequently, the substrates will be materials used in the graphic arts and in decorative applications. The substrates may be rigid or flexible; solid, porous or even liquid; either opaque or transparent to ultraviolet light. They may include paper ranging from tissue paper to heavy cardboard; films of plastics and polymeric materials such as regenerated cellulose, cellulose acetate, cellulose nitrate, polyethylene, polymethyl methacrylate, polyvinyl chloride; textile fabrics; glass; wood and metals. Opaque as well as transparent substrates may be used. Substrates in which the photosensitive composition is dissolved or which bear the composition as a coating on the side away from the light source must be transparent to radiation of wavelengths $W_1$ and $W_2$.

The novel light-sensitive compositions herein described are useful in a variety of applications. Among these are:

(1) Printing applications.—Very soft paper, as for example, tissue paper, can be easily imaged when it has been treated with the subject photosensitive composition, by projecting an image onto the treated surface using light of wavelength $W_1$. The imaged paper can then be easily deactivated by light of wavelength $W_2$.

(2) Pattern lay-out for metal working.—The photosensitive composition may be applied to a metal surface when suitably formulated as a paint or a lacquer. The metal surface may then be marked by irradiation with light of one wavelength through a suitable template and the image so produced may be made permanent by irradiation with light of a second wavelength. The image may correspond to holes which are to be drilled or other operations of metal working and manufacture. This technique is particularly valuable when the metal to be marked has an irregular shape.

(3) Engineering drawings.—When applied to paper, the light compositions of this invention form images in diazo printout equipment, where they can be made to give readily a variety of shades. The image is then deactivated by irradiation with light of a second wavelength. For many of the formulations, this deactivation may be effected by common room light during ordinary usage. In this case, no separate deactivation step is required.

(4) Microfilm.—The compositions of this invention may be formulated into films which can be irradiated and deactivated without being heated or treated with messy chemicals. Because of the excellent resolution, large reductions in size can be made. These microimages provide a convenient and space-saving way of storing vital records.

Representative examples illustrating the present invention follow.

General procedure for evaluation of deactivators

A solution is prepared by adding 10 ml. of a 0.005M solution of 2,2'-bis(o-chlorophenyl)-4,4',5.5'-tetraphenylbiimidazole in acetone and 10 ml. of a solution which is 0.01M in tris(4-diethylamino-o-tolyl)methane and 0.03M in trifluoroacetic acid in N,N-dimethylformamide to a solvent mixture containing 5 ml. of acetone, 6 ml. of dimethylformamide, 3 ml. of water and 1 ml. of a polyethylene glycol having an average molecular weight of 200 ("Carbowax" 200 supplied by Union Carbide Corporation). To this solution is added 1 ml. of a 0.1M solution in acetone of the candidate diazonium salt photodeactivator. Filter paper is impregnated with the resultant solution and allowed to air-dry. One half of the treated paper is covered with a Corning 7–54 filter (supplied by the Corning Glass Co.) which transmits light having a wavelength between 2500 A. and 3900 A. and causing color or image formation. The other half of the treated paper is covered with a Corning 0–51 filter which transmits light having wavelengths larger than 3450 A. and rendering the paper insensitive to the color or image forming light, i.e. deactivating the light-sensitive paper.

The paper is irradiated through the filters with two flashes from a low pressure xenon flash tube having an input of 200 watt-seconds and a light output of 5000 candle power seconds distributed between the wavelength of 3400 A. and 6500 A. (supplied by Hico Corp., Watertown, Mass. under the name of Hico-Lite Electronic Flash, Model K). The position of the filters is then reversed and the irradiation repeated. The portion of the paper first irradiated with light transmitted by the Corning 0–51 filter remains uncolored or has a color of significantly lower color intensity than the portion of the paper first irradiated with the light transmitted by the Corning 7–54 filter. In the absence of the deactivating diazonium compound both halves of the treated paper show the same depth of color because no deactivation occurs.

Various representative diazonium compounds that have been used and found to deactivate or desensitize the photosensitive paper are listed in Table I.

TABLE I

| Ex. No. | Diazonium compound |
|---|---|
| 1 | p-Anilinobenzenediazonium sulfate. |
| 2 | p-(p-Anisidino)benzenediazonium chloride. |
| 3 | 2,5-dibutoxy-4-morpholinobenzenediazonium sulfate. |
| 4 | 2,5-diethoxy-4-morpholinobenzenediazonium chloride, zinc chloride complex. |
| 5 | p-Diethylaminobenzenediazonium chloride, zinc chloride complex. |
| 6 | p-Diethylaminobenzene diazonium phosphomolybdate. |
| 7 | p-Diethylaminobenzenediazonium trifluoroacetate.[1] |
| 8 | 4-diethylamino-m-toluenediazonium chloride, zinc chloride complex. |
| 9 | p-Dimethylaminobenzenediazonium tetrafluoroborate. |
| 10 | p-[Ethyl(2-hydroxyethyl)amino]benzenediazonium chloride, zinc chloride complex. |
| 11 | 1,4-naphthalenediazonium oxide. |
| 12 | p-(p-Tolylthio)benzenediazonium chloride, zinc chloride complex. |

[1] 2.5 ml. of 0.1M solution used.

Representative photooxidants

Representative photooxidants which may be used in the invention composition are made 0.05 molar in acetone. Each solution of a photooxidant in an amount of 0.5 ml. is added to 6.75 ml. of a 50:50 by volume solution of acetone and N,N-dimethylformamide together with 0.5 ml. of a 0.1M solution of tris(4-diethylamino-o-tolyl)methane in acetone, 1.5 ml. of 0.1M solution of trifluoroacetic acid in acetone, 0.5 g. of polyethylene glycol (M.W. 200), and 0.25 ml. of 0.1M solution of 1,4-naphthalenediazonium oxide in a mixed solvent of 50:50 acetone/N,N-dimethylformamide. Filter paper is impregnated with the various solutions and dried in air. The treated papers are then irradiated beneath the filters as described above. In each case the light first passing through the Corning 7–54 filter initiates color formation while the light transmited by the Corning 0–51 filter deactivates the photosensitive composition. These results are shown by the papers remaining essentially colorless in that area first irradiated by the light passing through filter 0–51. The photooxidants of the different compositions are given in Table II.

TABLE II

| Ex. No. | Photooxidant |
|---|---|
| 12 | 1-diacetylaminobenzotriazole. |
| 13 | 2-diacetylaminobenzotriazole. |
| 14 | 1,1′-bibenzotriazole. |
| 15 | 1,2′-bibenzotriazole. |
| 16 | Carbon tetrabromide. |
| 17 | 2,6-dimethyl-4-(1,1,3,3-tetrafluoro-1,3-dichloroisopropylidene)-2,5-cyclohexadien-1-one. |
| 18 | Tetraacetylhydrazine. |
| 19 | Tetraphenylhydrazine. |
| 20 | N,N,O-triacetylhydroxylamine. |
| 21 | 1-diacetylamino-4-chloropyrazole. |
| 22 | 1-diacetylamino-3,5-diphenyl-1H-1,2,4-triazole. |

Representative color-generators

Various color-generators in solution in acetone are taken to prepare separate solutions as follows:

| | | |
|---|---|---|
| 50:50 by volume acetone/N,N-dimethylformamide | ml. | 6.75 |
| 2,2′-bis(o-chlorophenyl)-4,4′,5,5′-tetraphenylbiimidazole, 0.05M in acetone | ml. | 0.5 |
| p-Diethylaminobenzenediazonium trifluoroacetate 0.1M in 50:50 acetone/N,N-dimethylformamide | ml. | 0.25 |
| Color-generator, 0.1M in acetone | ml. | 0.5 |
| Trifluoroacetic acid, 0.1M in acetone | ml. | 1.5 |
| Polyethylene glycol (M.W. 200) | g. | 0.5 |

Filter paper is impregnated with each solution and air dried. The treated paper is irradiated as already described. Irradiation first through Corning 7–54 filter produces color of a shade depending upon the structure of the color-generator. The exposure to light transmitted by filter 0–51 deactivates the composition so it is no longer photosensitive. The color-generators present in the different compositions together with the color they produce are listed in Table III.

TABLE III

| Ex. No. | Color-generator | Color produced |
|---|---|---|
| 23 | Bis(4-diethylamino-o-tolyl)(p-benzylthiophenyl)methane. | Gray. |
| 24 | Bis(4-diethylamino-o-tolyl)(3,4-methylenedioxyphenyl)methane. | Green-gray. |
| 25 | 1,4-bis[bis(p-dimethylaminophenyl)-methyl]benzene. | Green-blue. |
| 26 | Tris(p-dimethylaminophenyl)methane | Violet. |
| 27 | α,β-Dicyano-4-dimethylaminohydrocinnamamide. | Red-violet. |
| 28 | α,β-Dicyano-4-dimethylaminohydrocinnamic acid, methyl ester. | Scarlet. |
| 29 | 10-benzoyl-3,7-bis(dimethylamino)phenothiazine. | Green-blue. |

Example 30.—Clear photosensitive film

A solution is prepared with the following ingredients in acetone solution where molarity is given.

| | | |
|---|---|---|
| 2,2′-bis(o-chlorophenyl)-4,4′,5,5′-tetraphenylbiimidazole, 0.05M | ml. | 0.5 |
| Tris(4-dimethylamino-o-tolyl)methane, 0.1M | ml. | 0.5 |
| Trifluoroacetic acid, 0.1M | ml. | 1.5 |
| p-Diethylaminobenzenediazonium trifluoroacetate, 0.1M | ml. | 0.75 |
| Water | ml. | 0.5 |
| Acetone | ml. | 6.25 |
| Polyethylene glycol (molecular weight 984) | g. | 0.5 |
| Cellulose acetate | g. | 0.5 |

The mixture is agitated until homogeneous, and films are cast on glass and on polyethylene coated paper. The films are then irradiated through a stencil with light passing through each of the filters and then through the filters in interchanged positions as described above in the absence of the stencil. The portion of the films first irradiated with light passed through Corning 7–54 filter bears a positive image while the area first irradiated with light passed through Corning filter 0.51 shows a negative image. Further irradiation fails to produce more color in either type of image; the diazonium compound deactivates the films against further light sensitivity.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A photosensitive composition which comprises, in intimate admixture, (a) an essentially colorless oxidizable nitrogen-containing organic color-generator selected from the class consisting of a leuco dye, 4,4′-ethylenedianiline, diphenylamine, N,N-dimethylaniline, 4,4′-methylenedianiline, triphenylamine, N-vinylcarbazole, and a mixture of an N,N-dialkylphenylenediamine with an active methylene-, aniline-, or phenolic coupling compound; said color-generator being stable to oxidation by atmospheric oxygen under normal room and storage conditions but being capable of oxidation to a colored species, (b) a photooxidant selected from the class consisting of a 2,2′,4,4′,5,5′-hexaarylbiimidazole, a tetraarylhydrazine, a tetraacylhydrazine, a diacylaminobenzotriazole, a benzothiazole disulfide, a triacylhydroxylamine, a diacylaminotriazole, an alkylidene-2,5-cyclohexadiene-1-one, polymethacrylaldehyde, a diacylaminopyrazole, a bibenzotriazole, carbon tetraiodide, iodoform, carbon tetrabromide, 1,2,3,4-tetrabromobutane, hexachloroethane, and 1,2,3,4-tetrachlorobenzene; said photooxidant being one which, when mixed with said color-generator and irradiated with radiation, $W_1$, of wavelength of about 2000 A. to about 4200 A. will, without further activation, oxidize said color-generator to said color species, (c) a light-sensitive aromatic diazonium compound having substituted on the aryl nuclei a substituent selected from the class consisting of lower alkyl, lower alkoxy, aryl, arylthio, bromine, chlorine, hydroxy, amino and amino which may have one or both hydrogens replaced by lower alkyl or aryl, said compound being one which upon exposure to light of wavelength $W_2$ in a region in which it absorbs or in which it can be sensitized forms a reducing agent which prevents photooxidative color-formation of the color-generator;

(d) a solvent present in an amount effective for causing said oxidation of said color-generator and said formation of said reducing agent.

2. A photosensitive composition according to claim 1 in combination with a supporting base.

3. A photosensitive composition according to claim 1 coated on a plastic film.

4. Paper treated with a composition according to claim 1.

5. A composition according to claim 1 wherein the organic color-generator of part (a) is an aminotriarylmethane containing at least two p-dialkylamino-substituted phenyl groups having a substituent ortho to the methane carbon atom, said substituent being selected from the group consisting of alkyl, alkoxy and halogen; said photooxidant of part (b) being a 2,2′-bis(o-substituted phenyl)-4,4′,5,5′-tetraphenylbiimidazole in which the o-substituent is chlorine, bromine, fluorine, $C_1$–$C_6$ alkoxy or $C_1$–$C_6$ alkyl and said diazonium compound of part (c) being selected from diazotized p-(p-tolylthio)aniline, 2,4,5-trimethoxyaniline, 5-amino-2-diethylamino-p-anisic acid, methyl ester, 4-(p-tolylthio)o-ansidine, 4-(4-amino-3-butylphenyl)morpholine, 4-(4-amino-2,5-diethoxyphenyl) morpholine, 4-(4-amino-2,5-dibutoxyphenyl)morpholine, 4-(p-aminophenyl)morpholine, 4-amino-1-naphthol, 4-amino-7-methoxy-3-methyl-1-naphthol, 4-amino-3-methyl-1-naphthol, $N^2$,$N^2$-dimethyl-1,2-naphthalenediamine, N,N-diethyl-1,4-naphthalenediamine, 2-methyl-$N^1$-phenyl-1,4-naphthalenediamine, 4-amino-2,6-dimethoxyphenol, $N^1$, N′-dimethyl-m-phenylenediamine, N,N-diethyl-o-phenylenediamine, $N^1$,$N^1$-diethyl-4-methyl-o-phenylenediamine, N-methyl-N-phenyl-o-phenylenediamine, p-phenylenediamine, 2-chloro-5-methoxy-$N^1$,$N^1$-dimethyl-p-phenylenediamine, $N^1$-cyclohexyl-2-methoxy-p-phenylenediamine, 2,5-dibutoxy-N,N-diethyl-p-phenylenediamine, 2,5-diethoxy-N,N-dimethyl-p-phenylenediamine, N,N-diethyl-p-phenylenediamine, 2,5-dimethoxy-N-phenyl-p-phenylenediamine, N,N-dimethyl-p-phenylenediamine, N-(2-hydroxyethyl)-N-ethyl-p-phenylenediamine, N-(p-methoxyphenyl-p-phenylenediamine, N-phenyl-p-phenylenediamine, 2-phenyl-$N^4$,$N^4$-dimethyl-p-phenylenediamine, 1-(p-aminophenyl)piperidine, 1-(p-aminophenyl)pyrrolidine, $N^2$,$N^2$-dimethyltoluene-2,5-diamine, 4-amino-2,6-xylenol, or from 3,5-dimethoxy-1,4-benzenediazonium oxide, 3,5-dimethyl-1,4-benzenediazonium oxide, 1,4-naphthalenediazonium oxide, or 6-methoxy-2-methyl-1,4-naphthalenediazonium oxide.

6. The composition of claim 1 wherein the color-generator is an aminotriarylmethane and the photooxidant is a 2,2′,4,4′,5,5′-hexaarylbiimidazole.

7. The process of producing an image having a light-stable background by irradiating, in a step-wise manner, the composition of claim 1 with light of wavelength $W_1$ and light of wavelength $W_2$, said wavelengths $W_1$ and $W_2$ being different and the first wavelength being applied in a graphic pattern.

8. The process of producing an image having a light-stable background by irradiating, in a step-wise manner, the composition of claim 2 with light of wavelength $W_1$ and light of wavelength $W_2$, said wavelengths $W_1$ and $W_2$ being different and the first wavelength being applied in a graphic pattern.

References Cited

UNITED STATES PATENTS

| | | | |
|---|---|---|---|
| 3,146,348 | 8/1964 | Workman | 96—49 |
| 2,884,326 | 4/1959 | Zemp | 96—90 |

FOREIGN PATENTS

| | | |
|---|---|---|
| 647,584 | 6/1964 | Belgium. |

J. TRAVIS BROWN, *Primary Examiner.*

CAROLYN DAVIS, *Assistant Examiner.*

U.S. Cl. X.R.

96—91, 48, 49

UNITED STATES PATENT OFFICE

CERTIFICATE OF CORRECTION

Patent No. 3,445,233 May 20, 1969

Lawrence Anthony Cescon

It is certified that error appears in the above identified patent and that said Letters Patent are hereby corrected as shown below:

Column 17, lines 31 and 32, "$N^1$,N'-dimethyl-m-phenylenediamine" should read -- $N^1$,$N^1$-diethyl-4-methyl-m-phenylenediamine, 4-methoxy-$N^3$,$N^3$-dimethyl-m-phenylenediamine --. Column 18, lines 2 and 3, "N-(p-methoxyphenyl-p-phenylenediamine" should read -- N-(p-methoxyphenyl)-p-phenylenediamine --.

Signed and sealed this 25th day of August 1970.

(SEAL)

Attest:

Edward M. Fletcher, Jr.

Attesting Officer

WILLIAM E. SCHUYLER, JR.

Commissioner of Patents